US010238039B2

(12) United States Patent
De Smet (10) Patent No.: US 10,238,039 B2
(45) Date of Patent: Mar. 26, 2019

(54) COMBINE HARVESTER GRAIN CLEANERS (71) Applicant: CNH Industrial America LLC, New Holland, PA (US)

(72) Inventor: Raf De Smet, Nieuwpoort (BE)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 15/085,807

(22) Filed: Mar. 30, 2016

(65) Prior Publication Data
US 2016/0286728 A1 Oct. 6, 2016

(30) Foreign Application Priority Data

Mar. 31, 2015 (BE) .................................. 2015/5201

(51) Int. Cl.
*A01F 12/32* (2006.01)
*A01F 12/44* (2006.01)
*A01F 12/46* (2006.01)

(52) U.S. Cl.
CPC .......... *A01F 12/448* (2013.01); *A01F 12/446* (2013.01); *A01F 12/46* (2013.01)

(58) Field of Classification Search
CPC ....... A01F 12/448; A01F 12/446; A01F 12/46
USPC ....................................... 460/101, 902, 102
See application file for complete search history.

(56) References Cited

U.S. PATENT DOCUMENTS

| 2,221,008 | A | * | 11/1940 | Eisenhand | B03D 1/06 209/169 |
|---|---|---|---|---|---|
| 3,515,144 | A | * | 6/1970 | Morrison | A01D 41/127 460/4 |
| 3,913,589 | A | * | 10/1975 | Rouse | A01F 12/44 460/90 |
| 4,250,897 | A | | 2/1981 | Glaser | |
| 4,344,443 | A | | 8/1982 | De Busscher et al. | |
| 6,003,387 | A | * | 12/1999 | Larson | G01F 1/30 460/1 |
| 6,672,957 | B2 | | 1/2004 | Voss et al. | |
| 7,846,013 | B1 | * | 12/2010 | Diekhans | A01F 12/448 460/1 |
| 7,927,199 | B2 | | 4/2011 | Adamson et al. | |
| 8,651,927 | B1 | * | 2/2014 | Roberge | A01F 12/444 460/101 |

(Continued)

FOREIGN PATENT DOCUMENTS

| DE | 1977623 U | 1/1968 |
|---|---|---|
| DE | 1987421 U | 6/1968 |
| DE | 20101248 U1 | 6/2001 |

*Primary Examiner* — Thomas B Will
*Assistant Examiner* — Mai T Nguyen
(74) *Attorney, Agent, or Firm* — Peter K. Zacharias; Patrick M. Sheldrake (57) ABSTRACT

A combine harvester grain cleaner. The grain cleaner includes an upper, relatively moveable framework supporting one or more grain sieves, one or more sources of drive for causing reciprocating movement of the one or more grain sieves, a lower, relatively fixed framework supporting one or more grain or tailings sheets, and a vibrator connected to the one or more grain and tailings sheets for causing a vibratory motion thereof and for, through the vibratory motion, causing movement of grain thereon in a predetermined direction. The vibratory motion has a higher frequency than a frequency of the reciprocation of the one or more grain sieves.

17 Claims, 5 Drawing Sheets

(56) References Cited

U.S. PATENT DOCUMENTS

| | | | |
|---|---|---|---|
| 8,821,229 B2* | 9/2014 | Stan | A01F 12/444 |
| | | | 460/99 |
| 2003/0186731 A1* | 10/2003 | Voss | A01F 12/448 |
| | | | 460/101 |
| 2006/0229119 A1 | 10/2006 | Wamhof et al. | |
| 2006/0270473 A1* | 11/2006 | Straeter | A01D 75/282 |
| | | | 460/99 |
| 2007/0254731 A1* | 11/2007 | Schmidt | A01F 12/00 |
| | | | 460/114 |
| 2009/0111545 A1* | 4/2009 | Pope | A01F 12/52 |
| | | | 460/14 |
| 2009/0186674 A1* | 7/2009 | Claerhout | A01F 12/44 |
| | | | 460/103 |
| 2009/0215510 A1* | 8/2009 | Schmidt | A01F 12/44 |
| | | | 460/109 |
| 2016/0029562 A1 | 2/2016 | De Smet et al. | |

* cited by examiner

COMBINE HARVESTER GRAIN CLEANERS

CROSS REFERENCE TO RELATED APPLICATION

This application claims priority to Belgium Application BE2015/5201 filed Mar. 31, 2015, which is incorporated herein by reference in its entirety.

FIELD OF THE INVENTION

The invention concerns improvements in or relating to combine harvester grain cleaners.

BACKGROUND OF THE INVENTION

The grain cleaner is a very important part of a combine harvester and is located inside the harvester vehicle. Various grain cleaner designs are known. Typically a grain cleaner includes an upper section in which a fan blows straw onto a series of adjacent straw walkers. The grains pass onto the upper of (typically) two or more sieves, the motion of which together with the settings of position-adjustable fingers of the sieves cleans the grains of various valueless components such as husks and dust.

Often two or three sieves are provided, one beneath the other to give rise to a sequential sieving process. The fingers of the lower sieve of a pair for this reason usually are set closer together than the fingers of the upper sieve. As a result the upper sieve removes coarse contaminants that then are not able to clog the fingers of the finer sieve below.

The straw walkers move straw separated from the remainder of the crop towards the rear of the combine harvester for ejection from the rear of the combine harvester as it moves in a field.

A further fan blows husks, dust, and other lightweight particles away from the cleaned grains.

The grains that are processed in the sieve(s) eventually fall through the lower sieve onto a clean grain sheet that causes them to move into an auger case. The auger continuously moves the grain towards a grain elevator which transports the grain into a graintank. There, an unloading tube conveys the grains into a wagon towed behind a tractor that moves alongside the combine harvester for this purpose.

Figure 1:
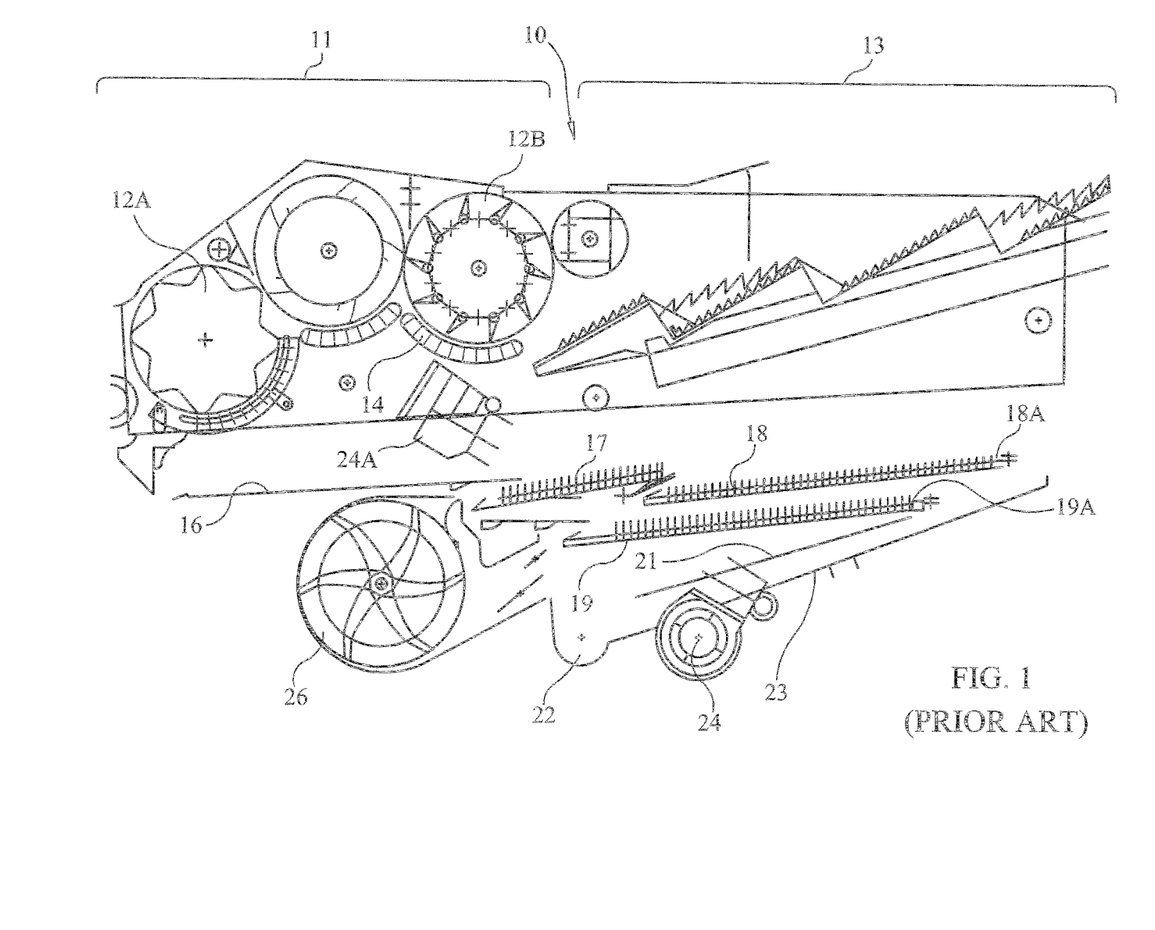
FIG. 1 shows, in schematic form, a conventional combine harvester comprising a threshing section, a straw walker section, and a grain cleaning section.

FIG. 1 illustrates, in a simplified form, part of the inner construction of a conventional combine harvester 10.

In FIG. 1 crop plant parts ingested at the front of the forwardly moving combine harvester 10 are threshed in a threshing section 11 where the action of a threshing drum 12a and separator 12b separates grains from stalks.

The stalks generally convey onto a series of adjacent, elongate straw walkers 13 as explained above by means of which they are conveyed towards the rear of the combine harvester 10 for cutting to consistent length and egestion onto the ground behind the combine harvester (or baling) 10. The threshed crop falls from concaves 14 of the threshing section 11 onto a grain pan 16 and thence is moved onto a series of sieves 17, 18, and 19 described in more detail below. The sieves 17-19 serve to clean the grain and prepare it for storage in a grain tank of the combine harvester 10.

The sieves in the example illustrated in FIG. 1 include a pre-sieve 17, an upper sieve 18, and a lower sieve 19 and are desirable because the action of the threshing section 11 does not remove all the valueless plant parts, such as husks, from the grains, and also because a certain percentage of the ears fed through the threshing section are incompletely threshed.

The operation of the sieves 17-19 is described below. Broadly speaking grains that are separated from stalks in the threshing section 11 fall through the concaves 14 onto grain pan 16 that reciprocates to move them onto the sieves 17, 18 and 19 in sequence.

Grains that are free of unusable material such as husks and other plant parts are small enough to fall through the lower sieve 19 onto a clean grain pan or sheet 21 located beneath the lower sieve 19. From the clean grain sheet 21 such grains pass into an auger case of the combine harvester 10. A clean grain auger represented by numeral 22 continuously evacuates the clean grain towards a grain elevator that transports the grain into the graintank of the combine 10.

As mentioned, not all the harvested grains are completely threshed and cleaned by the threshing and sieving parts 11, 17-19 of the combine harvester 10, however. Such incompletely threshed grains fall from a rear end 19a of the lower sieve 19 or, if the incompletely threshed grains are too large to pass through the upper sieve 18, from a rear end 18a of upper sieve 18, onto a tailings sheet or return grain sheet 23.

The tailings sheet 23 is similar to the clean grain sheet 21 with the exception that it conveys incompletely threshed grains to a re-threshing area 24a, instead of clean the clean grain auger 22.

The pre-sieve 17, upper sieve 18, and lower sieve 19 include upwardly pointing fingers that define a mesh of spaces. The positions of the fingers of at least the upper sieve 18 and the lower sieve 19 are adjustable such that the fineness of each sieve may be set. Under almost all circumstances the upper sieve 18 is arranged to sieve more finely than the pre-sieve 17 and less finely than the lower sieve 19. As grains move from the pre-sieve 17 to the upper sieve 18 and then to the lower sieve 19 therefore a progressively less coarse sieving action takes place until clean grains of sufficiently small size pass through the mesh defined by the lower, and hence least coarse, sieve 19.

A fan 26 is positioned forwardly of the sieves 17, 18, 19 and blows away unwanted matter such as dust, husks and plant parts that are discriminated by and therefore accumulate on the sieves 17-19 during their operation. Careful control of the sieve settings and the speed of the fan 26 results in the aforementioned effect of grains falling onto the clean grain sheet 21 and incompletely threshed crop falling onto the tailings sheet 23.

The grain pan 16, pre-sieve 17, upper sieve 18, lower sieve 19, clean grain sheet 21, and tailings sheet 23 in the conventional combine harvester 10 of FIG. 1 are all powered to move in order to move grain from one part of the machine 10 to another and to effect a cleaning action. The motions of the aforementioned components are best described with reference to FIG. 2, which shows the manner in which they are interconnected.

Figure 2:
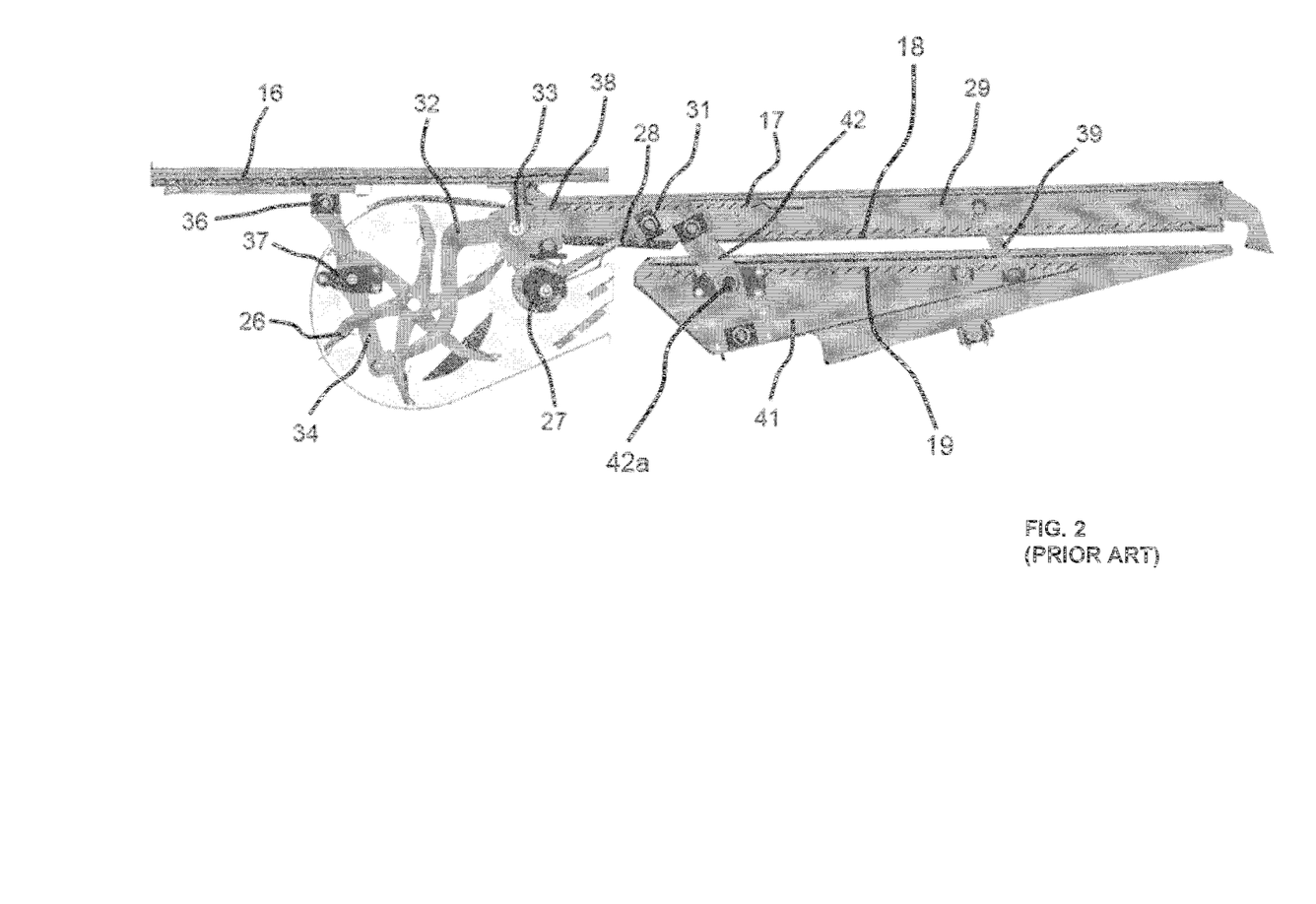
FIG. 2 illustrates, in detail, conventional linkages interconnecting conventional main grain cleaner components visible in FIG. 1.

With reference to FIG. 2, a first rigid link 28 is secured at one end by an eccentric drive to a motor or rotary drive shaft 27 and at its opposite end via a pivot 31 to a so-called upper shoe 29 to which the pre-sieve 17 and the upper sieve 18 are rigidly mounted. The upper shoe 29 is constrained to move at an angle determined by neutral position of the upper parts of links 42 and 39 (described below) as judged with reference to FIG. 2. Rotation of the motor or drive shaft 27 causes repeated reciprocating back and forth movement of the upper shoe 29.

At the forwardmost end of upper shoe 29, a cranked, rigid link 32 is secured by way of a further pivot 33, and at its end remote from the upper shoe 29 is pivotably secured to a further rigid link 34 that at its opposite end is secured by way of another pivot 36 to the underside of the grain pan 16.

Further, rigid link 34 is constrained by a pivoting yoke 37 approximately mid-way along its length; and a pivoting support link 38 supports the rear end of the grain pan 16. In some other conventional designs the upper shoe 29 and grain pan 16 move in the same direction and with the same motion, as a result of the pivot 33 being directly connected to the grain pan 16.

As a result of the illustrated arrangement, reciprocating motion of the upper shoe 29 causes similar reciprocating movement of the grain pan 16. Motion of the grain pan 16 back and forth however is antiphase to that of the upper shoe 29. Thus when the upper shoe 29 is moving forwardly the grain pan 16 is moving rearwardly, and vice versa.

A lower shoe drive link 42 extends downwardly from the underside of the rear of upper shoe 29 and is connected at its lower end to a lower shoe 41 supporting the lower sieve 19, clean grain sheet 21, and tailings sheet 23 beneath the upper shoe 29.

The lower shoe drive link 42 is rigid, is pivotably secured at either end and is further contained by a pivoting yoke 42*a* mid-way along its length, in a similar manner to link 32. A freely moveable suspension link 39 is pivotably secured at either end near the end of the upper and lower shoes 29, 41 that lies remote from drive link 42. As a result of this arrangement reciprocal back and forth movement of the upper shoe 29 is converted to antiphase back and forth movement of the lower shoe 41 beneath.

The lower shoe 41 supports the lower sieve 19, the clean grain sheet 21, and the tailings sheet 23. Movement of the lower shoe 41 therefore causes movement of these components in a manner that is antiphase to the movement of the parts supported by upper shoe 29.

The frequency of reciprocation of the grain pan 16, the pre-sieve 17, the upper sieve 18, the lower sieve 19, the clean grain sheet 21, and the tailings sheet 23 is the same by reason of the 1:1 transmission ratio represented by the various linkages described.

As a result of this arrangement grains falling onto the grain pan 16 is shaken firstly onto the pre-sieve 17 and thence onto the upper sieve 18. In the illustrated arrangement grains can also fall directly from pre-sieve 17 onto lower sieve 19.

Generally, however, grains sieved by the upper sieve 18 fall onto the lower sieve 19. Crop parts (i.e. incompletely threshed ears, etc.) that do not pass through the upper sieve are moved by reason of its reciprocating motion towards the rear of the upper sieve 18, from where they fall onto the tailings sheet 23 and are returned to the threshing section 11 as described. Lightweight husks and dust as mentioned are blown away from the sieves by the fan 26.

A similar process ensues in relation to the lower sieve 19, with the reciprocating motion causing clean grains to pass through the lower sieve 19 onto the clean grain sheet 21, and causing larger crop plant parts to move to the rear of the lower sieve from where they fall onto the tailings sheet 23.

The reciprocating motions and the angles of inclination of the clean grain sheet 21 and tailings sheet 23 are such as to cause movement of grains or crop parts (as appropriate) thereon along the respective sheets in the directions described above.

Variations on the above-described arrangement are known. It is a characteristic of most if not all of them that multiple sieves and grain or tailings sheets 21, 23 are caused to move in a reciprocal manner as explained.

During the somewhat complex cleaning process described above some grains and ears fall off the lateral edges of the grain sheet 21 and the tailings sheet 23. These would be wasted in the absence of measures to capture them, and to this end flexible (e.g. canvas) seals are installed in conventional combine harvesters 10 along the upper shoe 29 and lower shoe 41. These seals, however, can be relatively ineffective and are prone to failure through wear.

In conventional combine harvesters the clean grain and tailings sheets 21, 23, as explained, are also fixed to the lower shoe 41 which holds the lower sieve 19, such that they are powered by the same mechanism. The clean grain and tailings sheets 21, 23 are inclined when the combine harvester 10 is on level ground, with the result that shaking of the sheets 21, 23 causes movement of the grains in a direction determined by the direction of inclination.

The energy required to move the sieves 17-19 and the clean grain and tailings sheets 21, 23 is high. Apart from a high energy input requirement, the fatigue lives of these parts can be poor. Furthermore as noted despite the attempts made in the grain cleaner to avoid the spillage of grains some grain loss at the sides of the shoes occurs. This reduces the yield of crop, and is undesirable as a result.

It would be desirable to eliminate or at least ameliorate one or more drawbacks of conventional grain cleaners.

SUMMARY OF THE INVENTION

According to an aspect of the present invention, there is provided a combine harvester grain cleaner comprising an in-use upper, relatively moveable framework supporting one or more grain sieves; one or more sources of drive for causing reciprocating movement of the one or more grain sieves; and an in-use lower, relatively fixed framework supporting one or more grain and/or tailings sheets, the or each said grain and/or tailings sheet being vibratory in use and connected to a vibrator that causes movement of grain thereon in a predetermined direction through grain and/or tailings sheet vibration at a higher frequency than the frequency of reciprocation of the one or more grain sieves.

The clean grain and tailings on the one hand thus are de-coupled from the sieves on the other and are required to move/vibrate with much reduced amplitudes than in a conventional grain cleaner arrangement. As a result, less energy is required during operation of the combine harvester (in turn since it is not necessary to power the clean grain and tailings sheets, which in some combine harvester designs can account for perhaps 45% of the mass of the moving parts of the shoe structure, to reciprocate over a large locus of movement).

Furthermore, the provision of a relatively fixed framework supporting the clean grain and tailings sheets means that the lateral edges of the latter can be sealed to, for example, the casing of the auger and the main frame of the combine harvester. This beneficially eliminates grain losses through spillage from the sheets during operation of the grain cleaner.

In conventional combine harvesters, the lower shoe structure includes clean grain and tailing sheets that are bolted to the lower sieve. In the combine harvest grain cleaner in accordance with aspects of the present invention, the lower shoe structure typically supports one or more sieves by bolting. No grain or tailings sheet is included in this structure. Additionally, clean grain and tailings sheet are provided in a fixed structure (which can be connected with the main frame of machine) containing a connection to a vibrator.

Desirably, the upper framework supports a moveable pre-sieve and an upper sieve. However, embodiments in which more or fewer than the two preferred sieves are present are contemplated.

Also desirably, the upper framework includes an in-use upper shoe that supports at least an upper grain sieve and that is connected to an in-use lower shoe that supports at least a lower grain sieve, the upper shoe being moveable relative to the lower framework and the upper and lower shoes being moveable one relative to the other. As a result the sieves are moveable independently of one another, while maintaining the movability of the upper framework relative to the fixed lower framework.

Conveniently, the upper shoe defines upstanding, mutually spaced upper shoe walls, and the upper grain sieve interconnects the upper shoe walls. This construction is robust and provides for movement of the upper sieve independently of the lower sieve.

Desirably the lower shoe defines upstanding, mutually spaced lower shoe walls, and at least one said grain sieve interconnects the lower shoe walls.

Also desirably the lower framework defines upstanding, mutually spaced lower framework walls, and at least one of the clean grain sheet and the tailings sheet interconnects the lower framework walls.

Also desirably, the connections of the at least one of the clean grain sheet and the tailings sheet to the lower framework walls are uninterrupted along the lengths of the connections. This arrangement addresses the problem of spillage of grain from the lower shoe and is believed to eliminate grain loss.

In an exemplary embodiment of the present invention, the grain cleaner includes a clean grain sheet and tailings sheet interconnecting the lower framework walls. It is, however, possible to envisage embodiments of the invention in which more or fewer of such sheets are supported in the lower framework.

Conveniently, each of the lower framework walls is secured to a side of a case of an auger forming part of a combine harvester. This beneficially provides a secure mounting for the lower framework in a manner satisfying the requirement for it to be relatively fixed, yet vibratory.

In further exemplary embodiments of the present invention, at least one of the clean grain sheet and the tailings sheet includes a coating that promotes movement of grains thereon. The coating advantageously reduces the amount of energy required to cause vibration of the sheet(s) in a manner that encourages movement of grains in a preferred direction. To this end, the coating may be selected from the list including an ultra-high molecular weight polyethylene compound and an ultra-high molecular weight polyurethane compound.

The vibrator referred to above may be embodied in a range of ways. In one embodiment, the vibrator includes a reciprocatory motor having a linkage that connects to the grain sheet, and/or the tailings sheet, and/or the lower framework.

The linkage optionally may include an eccentric drive in order to induce vibratory movement of at least one of the grain sheet and the tailings sheet. Additionally or alternatively, the linkage optionally may include a hammer that on operation of the motor repeatedly strikes the grain sheet, and/or the said tailings sheet, and/or the lower framework, thereby advantageously imparting the required grain vibratory motion of the lower, relatively fixed framework or at least one of the grain sheet and the tailings sheet supported thereby.

The motor optionally may be separate from the remainder of the drive components of a combine harvester in which the grain cleaner is mounted. Alternatively, the motor may be connected to power a subsystem of a combine harvester. Thus, the vibratory motion of the lower framework, etc. may, if desired, be created through a technique of power take-off from, for example, a drive train in the combine harvester.

Further desirably, the motor may be, or may include, one or more of (i) a combine harvester engine and (ii) a component of a combine harvester that oscillates during forward combine harvester movement. As a non-limiting example of such an arrangement, one could design a grain sheet to exhibit such inclination that the movement of the machine and/or residual vibration of other components may be sufficient to transport the grain on the sheets to the augers.

Desirably, the lower framework and at least one of the grain sheet and the tailings sheet supported thereby in use reacts a downwardly acting force of at least 500 N without distorting. Thus, the lower framework and the components it supports can withstand the mass of a human operator standing on them. This is an advantage over conventional arrangements, in which the grain and tailings sheets being fixed to moveable lower shoe parts could provide a safe step for an operator only following the installation of additional structure in the lower shoe. This aspect of the conventional arrangements thus further decreased the durability of the lower shoe.

According to another aspect of the present invention, there is provided a vehicle, such as a combine harvester, which vehicle comprises a grain cleaner, in accordance with an exemplary embodiment of the present invention.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 3:
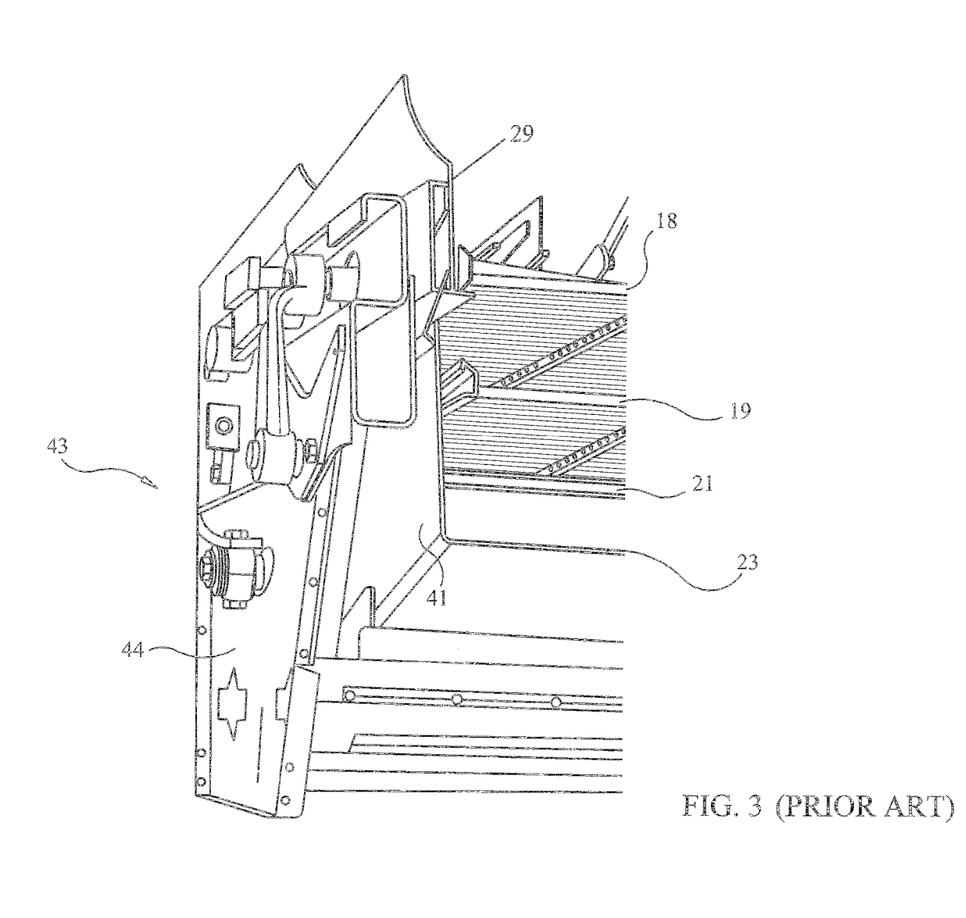
FIG. 3 shows, in perspective view, part of a grain cleaner of the conventional combine harvester of FIG. 1.

Referring to FIG. 3, there is illustrated a conventional grain cleaner section 43 of the conventional harvester 10 generally of the kind described in relation to FIGS. 1 and 2 comprises an upper shoe 29 part of which is visible in the figure. The upper shoe 29 comprises a pair of upstanding side walls respectively on opposite sides of an interior of the combine harvester 10, inside the top of a casing 44 of augers 22, 24 that are conventionally present for the purpose of elevating clean grain to a grain tank forming part of the harvester vehicle 10 and elevating incompletely threshold crop parts to the re-threshing section 24a for re-threshing.

The side walls of the upper shoe 29 support from above and extending between them the upper sieve 18 that overlies the lower sieve 19. Lower sieve 19 in turn overlies the clean grain sheet 21. The clean grain sheet 21 overlies the tailings sheet 23 (the purpose of which as described above is to recycle grains that have fallen from the rear ends of the sieves without being completely stripped of non-grain parts).

The lower sieve 19 is supported by the lower shoe 41, that also supports suspended beneath lower sieve 19 the clean grain sheet 21 and the tailings sheet 23. The lower shoe 41 in like manner to the upper shoe 29 comprises upstanding lateral sidewalls at either side of the combine harvester. The lower sieve 19, the clean grain sheet 21, and the tailings sheet 23 extend between, and along their lateral edges are connected to, the side walls of the lower shoe 41.

As described above the upper and lower shoes 29, 41 are reciprocally moveable independently of one another. A series of drive linkages causes mutually antiphase reciprocation of the parts supported respectively by the upper shoe 29 and the lower shoe 41.

The mass of the sieves 18, 19, the clean grain sheet 21, and the tailings sheet 23 is high. As a result it requires considerable energy to cause reciprocation of the various moveable parts of the conventional grain cleaner 43. This is undesirable because of the general need to reduce the energy consumption of the combine harvester 10, and also because it necessitates the installation of a large motor the cost of which is high. Furthermore, the movement of a significant number of heavy parts can give rise to significant vibrations. Aside from the fact that these are unpleasant for combine harvester operators to experience, heavy vibrations can cause premature wear or failure of parts of the combine harvester 10.

In addition the fact that the clean grain and tailings sheet 21, 23 move with the lower sieve 14 means they cannot be fully sealed along their lateral edges. As a consequence, unacceptably large amounts of grain may fall from them during operation of the cleaner 43.

Figure 4:
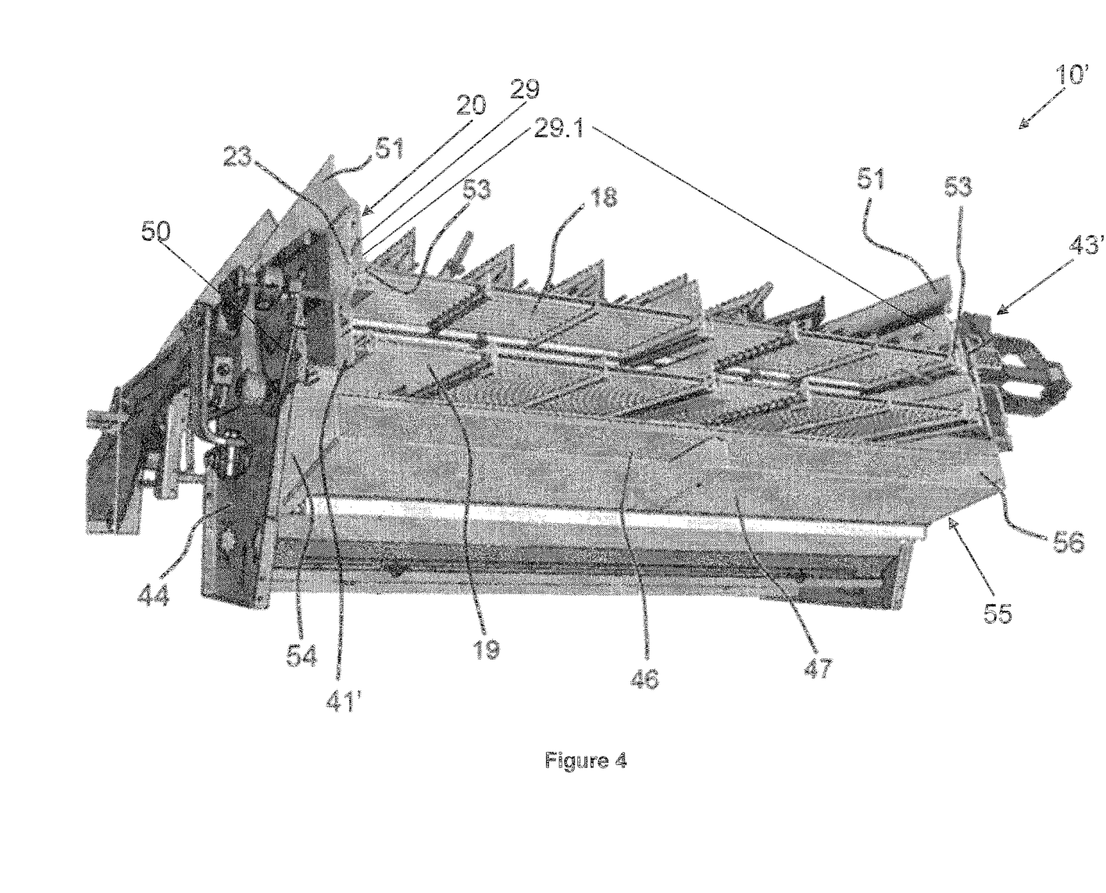
FIG. 4 shows, in perspective view, a grain cleaner comprising grain an tailings sheets, in accordance with an exemplary embodiment of the present invention.
Figure 5:
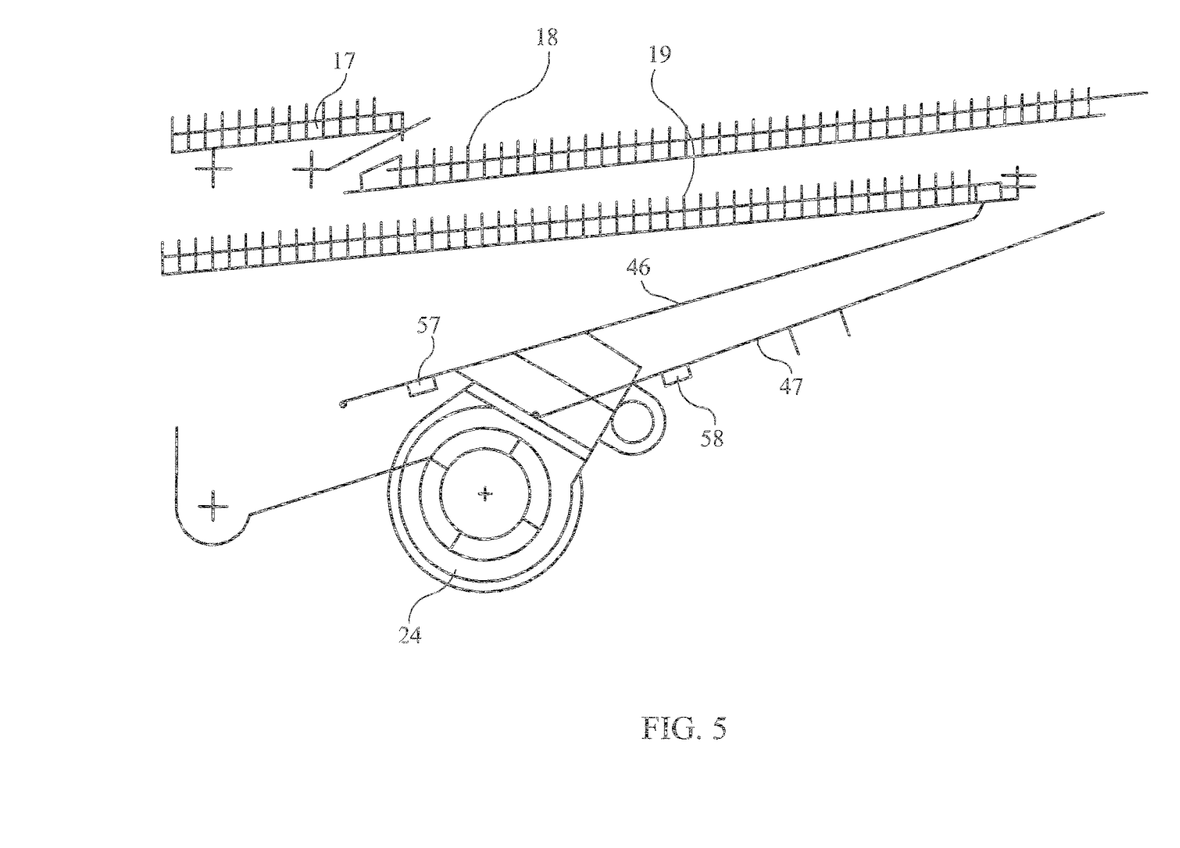
FIG. 5 shows, in schematic form, one way of conveying vibratory motion from a motor to grain and tailings sheets, such as those of FIG. 4, in accordance with an exemplary embodiment of the present invention.

FIGS. 4 and 5 show a grain cleaner 43' of a combine harvester 10', in accordance with an exemplary embodiment of the present invention. The combine harvester 10' includes the components of the harvester 10; however the combine harvester 10' comprises a grain cleaner 43' that differs from the conventional grain cleaner 43. Like components of the grain cleaners 43 and 43' are identified with like reference numbers.

In FIG. 4, the upper shoe 29 is similar or identical to the counterpart component shown in FIG. 3. The upper shoe 29 extends downwardly as respective side walls 29.1 on either side of the combine harvester 10'.

An upper sieve 18 that may be similar to sieve 18 of FIG. 3 or may be a different design extends between the downwardly extending side walls 29.1 of the upper shoe 29. The sieve 18 includes extending along each lateral edge extrusion profiles 53 defining channels in which mating protrusions of the shoe parts 29 are received. As a consequence, the upper sieve 18 is suspended at the lower edge of, and is reciprocally moveable back and forth supported by, the walls 29.1 of upper shoe 29.

At their upper edges, the side walls 29.1 are secured to longitudinally extending flexible canvas seals 51 that prevent grain spillage in the manner described above.

The lower shoe 41' of FIG. 4 differs from the lower shoe 41 of FIG. 3 in that it extends downwardly only a short distance sufficient to support the lower sieve 19, and is not deep enough also to support the clean grain sheet 46 or the tailings sheet 47 described below. In other words the lower shoe 41' may be regarded as a depth-truncated modification of the lower shoe 41 of FIG. 3 or a copy of the upper shoe 29. The lower shoe 41' permits reciprocal back and forth movement of the lower sieve 19 alone. Such movement of the lower sieve 19 is independent of that of upper sieve 18.

The upper 29 and lower 41' shoes of FIG. 4 collectively amount to an in-use upper, relatively moveable framework 20 supporting one or more grain sieves 18, 19. The manner of fixing of the lower sieve 19 to the lower shoe 41' may be similar to that used to secure the upper sieve 18. In either case, however, other fixing arrangements are equally possible.

In a significant departure from the arrangement of FIG. 1, the clean grain sheet 46 and tailings sheet 47 of the grain cleaner 43' are supported in a relatively fixed framework 55 comprising fabricated, rigid sidewalls 54, 56 secured to either side of a main frame 50 of the combine harvester 10' and/or the casing 44 of the augers 22, 24 of the combine harvester 10'. The clean grain sheet 46 extends between the respective sidewalls 54, 56 above the tailings sheet 47 in a similar relationship to that shown in FIG. 3, but the framework 55 comprising the sidewalls 54, 56 is relatively fixed compared with that supporting the upper and lower sieves 18, 19. Thus, in this arrangement, the sheets 46, 47 are not directly coupled to the lower sieve 19 with the result that movement of the lower sieve 19 does not cause movement of the clean grain and tailings sheets 46, 47.

The clean grain and tailings sheets 46, 47 further differ from the clean grain and tailings sheets 21, 23 of FIGS. 1 to 3 in that they are fixed to the sidewalls 54, 56 along their lateral edges. In consequence, the lateral edges of the sheets 46, 47 are sealed against grain loss, thereby reducing the problem of spilled grains described above and obviating the need for canvas seals in the lower part of the grain cleaner 43'.

The sidewalls 54, 56 and/or the sheets 46, 47 themselves are coupled to one or more vibrators 57, 58, shown schematically shown in FIG. 5. The vibrators may each include but are not limited to electric motors such that the sheets 46, 47 are vibratory under the influence of the motors when the latter are energised.

In FIG. 5, a vibrator 57 is shown suspended beneath clean grain sheet 46, and a second vibrator 58 is shown suspended beneath tailings sheet 47. However, in other embodiments, differing arrangements are possible. Thus, one or more vibrators may lie on top of one or more of the sheets 46, 47; or one or more vibrators may be positioned to act on one or more of the sidewalls 54, 56 forming part of the fixed lower framework 55. Numerous other location and attachment options for the vibrators will occur to the person of skill in the art, and lie within the scope of the invention as claimed.

Various designs of vibrator moreover are possible. Thus, at least one of the vibrators 57, 58 may include a dedicated motor or it may include, for example, a linkage from a conventional motor forming part of the combine harvester in a manner that transfers vibratory energy to the sheets 46, 47. Another possible arrangement includes a rotary motor the output of which is coupled via an eccentric drive to a hammer that on operation of the motor strikes one or more of the sheets 46, 47, or one of the sidewalls 54, 56 in a manner that induces vibration of the material of the grain pans. Yet a further form of vibrator is possible is a mechanism that is induced to vibrate, e.g. by forward motion of a combine harvester 10' in which the grain cleaner 43' is installed. Such vibration can be coupled by one or more linkages to cause the desired vibration of the sheets 46, 47.

The inclinations of the clean grain sheet 46 and tailings sheet 47 are such that vibration of them as aforesaid causes movement of grains on them in a predetermined direction (that in the case of the clean grain sheet 46 is towards the clean grain tank; and in the case of the tailings sheet 47 is towards the tailings auger 24).

It is desirable for the upper surfaces of the clean grain sheet 46 and tailings sheet 47 to include one or more coatings that promote the sliding movement of grains (or other crop portion the case of the tailings sheet 47). Examples of suitable coatings include but are not limited to ultra-high molecular weight polyethylene compounds and ultra-high molecular weight polyurethane compounds.

The relatively moveable framework 20 and the relatively fixed framework 55 described above may be fabricated or otherwise constructed from metals, especially steels. The arrangement, in particular, of the sidewalls 54, 56 and the clean grain and tailings sheets 46, 47 may be braced in a sufficiently rigid manner as to support without distortion the mass of a human operator who may use one or both the sheets 46, 47 as a step when gaining access to the interior of the combine harvester 10' for the purpose of cleaning it or performing maintenance.

In use the upper and lower sieves 18, 19 perform in essentially the same way as the conventional sieves 17-19, but the energy required for this is considerably less than in the case of the FIG. 1 arrangement. This is because the mass of the parts attached to the lower shoe 41 to be reciprocated by the motor provided for this purpose is much less in the FIG. 4 embodiment than in the FIGS. 1 to 3 apparatus.

Consequently, the energy consumption of the combine harvester 10' is less when the FIGS. 4 and 5 grain cleaner 43' is installed than when the conventional grain cleaner 43 is present. Furthermore, as noted the levels of discernible vibration are less.

The sheets 46, 47 of FIGS. 4 and 5 operate differently than in the conventional grain cleaner 43, since their movement is vibratory and although of higher frequency than the reciprocating movement of the conventional clean grain and tailings sheets 21, 23 is of relatively small amplitude. This is sufficient to cause movement of grains in the intended direction without a need to move large parts of the lower section of the grain cleaner over a significant locus. This has the additional benefit of making the operation of the combine harvester 10' quieter than has hitherto been possible. Thus, the grain cleaner 43' represents a significant improvement in the efficiency of combine harvester grain cleaners.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A grain cleaner for a combine harvester, the grain cleaner comprising:
an upper, relatively moveable framework supporting one or more grain sieves;
one or more sources of drive for causing reciprocating movement of the one or more grain sieves;
a lower, relatively fixed framework supporting one or more grain or tailings sheets and the lower, relatively fixed framework defines upstanding, mutually spaced lower framework walls, and the one or more grain or tailings sheets interconnects the lower framework walls; and
a vibrator connected to the one or more grain and tailings sheets for causing a vibratory motion thereof and for, through the vibratory motion, causing movement of grain thereon in a predetermined direction, the vibratory motion having a higher frequency than a frequency of the reciprocation of the one or more grain sieves.

2. The grain cleaner of claim 1, wherein one or more grain sieves comprise at least a moveable pre-sieve and an upper sieve.

3. The grain cleaner of claim 1, wherein:
the one or more grain sieves comprises at least an upper grain sieve and a lower grain sieve,
the upper, relatively moveable framework comprises an upper shoe supporting the upper grain sieve and a lower shoe supporting the lower grain sieve,
the upper shoe is moveable relative to the lower, relatively fixed framework, and
the upper and lower shoes are moveable relative to one another.

4. The grain cleaner of claim 3, wherein the upper shoe defines upstanding, mutually spaced upper shoe walls, and wherein at least the upper grain sieve interconnects the upper shoe walls.

5. The grain cleaner of claim 3, wherein the lower shoe defines upstanding, mutually spaced lower shoe walls, and wherein at least the lower grain sieve interconnects the lower shoe walls.

6. The grain cleaner of claim 1, wherein the connections of the at least one of the one or more grain or tailings sheets to the lower framework walls are uninterrupted along the lengths of the connections.

7. The grain cleaner of claim 6, wherein the at least one of the one or more grain or tailings sheets comprises a grain sheet and a tailings sheet, each interconnecting the lower framework walls.

8. The grain cleaner of claim 1, wherein each of the one or more grain or tailings sheets comprises a coating that promotes movement of grains thereon.

9. The grain cleaner of claim 8, wherein the coating is formed from an ultra-high molecular weight polyethylene compound or an ultra-high molecular weight polyurethane compound.

10. The grain cleaner of claim 1, wherein the vibrator comprises a reciprocatory motor comprising a linkage that connects to at least one of the one or more grain or tailings sheets or to the lower, relatively fixed framework.

11. The grain cleaner of claim 10, wherein the linkage comprises an eccentric drive.

12. The grain cleaner of claim 1, wherein the lower, relatively fixed framework and the one or more grain or tailings sheets supported can withstand a downwardly acting force of at least 500 N without distorting.

13. A harvester comprising:
a threshing section;
a main frame; and
a grain cleaner comprising:
an upper, relatively moveable framework supporting one or more grain sieves;
one or more sources of drive for causing reciprocating movement of the one or more grain sieves;
a lower, relatively fixed framework supporting one or more grain or tailings sheets, the lower, relatively fixed framework attached to the main frame, and the lower, relatively fixed framework defines upstanding, mutually spaced lower framework walls, and the one or more grain or tailings sheets interconnects the lower framework walls; and a vibrator connected to the one or more grain and tailings sheets for causing a vibratory motion thereof and for, through the vibratory motion, causing movement of grain thereon in a predetermined direction, the vibratory motion having a higher frequency than a frequency of the reciprocation of the one or more grain sieves.

14. The harvester of claim 13, wherein one or more grain sieves comprise at least a moveable pre-sieve and an upper sieve.

15. The harvester of claim 13, wherein:
the one or more grain sieves comprises at least an upper grain sieve and a lower grain sieve,
the upper, relatively moveable framework comprises an upper shoe supporting the upper grain sieve and a lower shoe supporting the lower grain sieve,
the upper shoe is moveable relative to the lower, relatively fixed framework, and
the upper and lower shoes are moveable relative to one another.

16. The harvester of claim 15, wherein the upper shoe defines upstanding, mutually spaced upper shoe walls, and wherein at least the upper grain sieve interconnects the upper shoe walls.

17. The harvester of claim 15, wherein the lower shoe defines upstanding, mutually spaced lower shoe walls, and wherein at least the lower grain sieve interconnects the lower shoe walls.

\* \* \* \* \*